(12) United States Patent
Bossuyt et al.

(10) Patent No.: US 8,197,920 B2
(45) Date of Patent: Jun. 12, 2012

(54) PROCESS FOR OBTAINING A POLYMER FILM FOR HIGH-RESOLUTION INKJET PRINTING, THE OBTAINED FILM, PRINTING SYSTEM AND METHOD

(75) Inventors: Jochen Bossuyt, Kerkhove (BE); Olivier Piernot, Brussels (BE); Marc Fraix, Chevigny-Saint-Sauveur (FR); Xavier Lepot, Ellezelles (BE)

(73) Assignee: Renolit AG, Worms (DE)

( * ) Notice: Subject to any disclaimer, the term of this patent is extended or adjusted under 35 U.S.C. 154(b) by 878 days.

(21) Appl. No.: 12/090,311

(22) PCT Filed: Oct. 21, 2006

(86) PCT No.: PCT/EP2006/010168
§ 371 (c)(1),
(2), (4) Date: Sep. 26, 2008

(87) PCT Pub. No.: WO2007/048548
PCT Pub. Date: May 3, 2007

(65) Prior Publication Data
US 2009/0305004 A1   Dec. 10, 2009

(30) Foreign Application Priority Data
Oct. 26, 2005   (EP) ..................................... 05110050

(51) Int. Cl.
*B41M 5/40* (2006.01)
(52) U.S. Cl. .................. 428/32.23; 428/212; 428/424.6; 428/447; 428/913.3
(58) Field of Classification Search ............... 428/32.23, 428/212, 424.6, 447, 913.3; 347/105
See application file for complete search history.

(56) References Cited

U.S. PATENT DOCUMENTS

| | | | |
|---|---|---|---|
| 2005/0227091 A1* | 10/2005 | Suto et al. | 428/447 |
| 2005/0288435 A1* | 12/2005 | Pfaendner et al. | 525/71 |
| 2009/0305004 A1* | 12/2009 | Bossuyt et al. | 428/195.1 |

FOREIGN PATENT DOCUMENTS

| | | |
|---|---|---|
| DE | 199 43 330 A1 | 3/2001 |
| EP | 0 426 482 B1 | 5/1991 |
| JP | 6-87996 A | 3/1994 |
| JP | 2000-344907 A | 12/2000 |
| WO | WO 2004/029156 A1 * | 4/2004 |

* cited by examiner

*Primary Examiner* — Betelhem Shewareged
(74) *Attorney, Agent, or Firm* — Paul D. Strain, Esq.; Strain & Strain PLLC

(57) ABSTRACT

Process for improving the resolution of inkjet printing of polymer films comprising a base polymer according to which a copolymer additive comprising a polymer group A and a polymer group B is blended with the base polymer, group A having a lower surface tension than that of the base polymer and group B being compatible with the base polymer.

17 Claims, No Drawings

PROCESS FOR OBTAINING A POLYMER FILM FOR HIGH-RESOLUTION INKJET PRINTING, THE OBTAINED FILM, PRINTING SYSTEM AND METHOD

The invention relates to high-resolution inkjet printing of polymer films.

Inkjet printing is a technique in which droplets of ink are guided in a controlled manner directly onto the surface to be printed. This technique easily lends itself to digital control by a computer. Contrary to traditional printing techniques in which the formes are placed in contact with the film to be printed (via, for example, cylinders or screens), inkjet printing takes place without contact between the printing machine and the printed substrate. The quality of the printing obtained depends therefore directly on the fineness of the droplets and on the accuracy of the inkjet control.

To obtain good resolution, that is to say accuracy in rendering the details, it is important that the ink droplets do not spread out too much on the printed film. The ratio of the diameter of the printed dot after drying to the diameter of the ink droplet from which it originated (dot gain) must be as small as possible (advantageously between 1.5 and 3) in order to obtain a high resolution. This problem is particularly noticeable when organic inks intended for inkjet printing are used because these inks are very fluid and spread out rapidly.

A known method for reducing the dot gain is to promote rapid absorption of the droplet into the printed film, before the droplet has time to spread on its surface. To this end it is known to use inks that partly dissolve the surface of the printed polymer. In the case of printed PVC (polyvinyl chloride) films for example, inks comprising ketones such as methyl hexyl ketone or cyclohexanone cause a rapid swelling of the PVC surface that accelerates their absorption. Such inks have, however, risks because their vapours are toxic. Their use imposes moreover recourse to costly protection and ventilation systems.

It is also known to mix with the base polymer comprising the printed film an additive promoting rapid absorption of the ink. In DE 19943330 (Renolit-Werke GmbH), an inkjet printing method is described in which the printed film contains cellulose esters comprising acetyl, propionyl or butyryl groups. However, in this known method, significant quantities (around 10-20%) of esters are required, which appreciably increases the cost of the film and has adverse effects on other properties (e.g. mechanical properties) of the film.

JP 2000 344907 (abstract) relates to improving mechanical properties of PVC films and proposes to add an elastomer, the problem of resolution during inkjet printing is not discussed.

JP 06 087996 (abstract) relates to pressure sensitive PVC sheets for ink jet printing, the problem of resolution is not discussed.

EP 426 482 relates to the problem of distributing particulate fillers homogenously. The the use of a second polymer is described, having a surface tension intermediate between the intended filler and the base polymer, whereby the filler is encapsulated and at the same time continuous phase within the base polymer is established. Resolution for films used in inkjet printing is not discussed.

The invention aims to obtain an economical polymer film that may be printed by high-resolution inkjet with inks that are free from toxic solvents.

Consequently, the invention relates to a process for improving the resolution of inkjet printing of polymer films comprising a base polymer according to which a copolymer additive comprising a polymer group A and a polymer group B is blended with the base polymer, group A having a lower surface tension than that of the base polymer and group B being compatible with the base polymer.

The term "polymer film" is understood to mean a flat product having a thickness at least 100 times, preferably 1000 times, lower than its other dimensions. Typically, the films conforming to the invention have a thickness between 20 and 500 microns, a width between 10 and 250 centimetres and a length between 10 and 10 000 metres. The films are advantageously handled in the form of rolls. They are produced for example by extrusion or preferably by calendering, from a composition comprising a base polymer that represents advantageously at least 40% by weight, preferably 50%, and more preferentially at least 60% of the composition. Other ingredients of the composition may be: other secondary polymers, various additives such as stabilizers or plasticizers or fillers such as silica and calcium carbonate for example.

According to the invention, the film comprises a copolymer additive comprising a polymer group A and a polymer group B. Group A has a low surface tension and is intended for reducing the dot gain of the inkjet droplets. Group B is compatible with the base polymer and is intended for ensuring good miscibility of the additive. The additive may be comprised of a simple AB combination of a group A and a group B. However, more complex structures such as for example linear, cyclic, branched or star ABA, BAB, AAB, BBA or ABABA may be advantageous. The B groups may also be grafted onto the A groups or vice versa.

It is advantageous that the additive migrates sufficiently to the surface of the film because it is there that it carries out its function. To this end it is recommended that its overall molecular weight be lower than that of the base polymer. The compatibility of group B with the base polymer ensures moreover good adherence of the additive to the surface, and therefore good mechanical strength of the printed layer. The average molecular weight of the additive is advantageously from 500 to 50 000 g/mol, preferably from 1000 to 8000 g/mol.

Moreover, in a preferred variant of the process according to the invention, the overall average molecular weight of the A group(s) of the additive is between 40 and 90%, preferably between 50 and 80%, of the overall molecular weight of the additive.

The quantity of additive present in the film depends on various factors, of which the most important are the ink used, the base polymer and various other film constituents. It was observed that low additive quantities suffice in general in order to obtain excellent resolution when inkjet printing. In practice, it is recommended that the film comprise 0.1 to 1 parts by weight of additive per 100 parts of base polymer.

According to the invention, group A has a lower surface tension than that of the base polymer. It is recommended that this surface tension be less than 0.95 times that of the base polymer. It is in general preferable that this surface tension be less than 0.9, advantageously 0.8, preferably 0.7, more preferentially 0.6, times that of the base polymer. It is recommended, even in the case of organic inks having very low surface tension and base polymers having very high surface tension, that the surface tension of the additive be less than 0.5 times that of the base polymer. The surface tension is measured (for all the values in this text) in accordance with the DIN 53 364 standard.

In order to promote surface migration of the additive, it is also recommended that group A be incompatible with the base polymer. In some cases it may be necessary to subject the film to a surface treatment such as plasma or corona treatment in order to activate group A and promote the migration.

Polymer group B must be compatible with the base polymer. It is therefore advantageous that it be comprised originally of the same monomer as that of the base polymer. In general it will differ therefrom in the molecular weight, the nature of possible copolymers and the polymerization structure (heavily or lightly branched structure, star structure, etc.).

The choice of base polymer depends on the final application of the printed film. The invention is of particular use when the base polymer is chosen from: polyvinyl chloride, polyolefins, polystyrene, polycarbonate, polymethacrylate or blends thereof. PVC is preferred.

In a first recommended embodiment of the method in which the base polymer is polyvinyl chloride, the polymer comprising group A is chosen from:

olefin polymers having a formula $C_nH_{2n}$ with n from 1 to 12, in which the hydrogen atoms may be partly or totally substituted by fluorine atoms or by copolymerized or grafted fluoro groups; and polyalkylsiloxanes and their grafted polymers or copolymers.

Polyalkylsiloxanes are preferred.

In a second recommended embodiment of this method, the group B polymer is chosen from:

ethylene/vinyl acetate copolymers, possibly terpolymerized at a weight ratio varying from 2 to 20% with a monomer consisting of carbon monoxide or sulphur dioxide;

polyvinyl chloride; and advantageously, aliphatic polyesters such as polycaprolactone or polybutylene terephthalate.

In the process according to the invention, the film may be single-layered. It will, in general, be like this when it is produced by calendering. However, in an advantageous embodiment of the invention the film is multilayer, one of its outer layers conforming to the film obtained by the process according to the invention. In this implementation method the other layers may be comprised totally or partly of the same base polymer as the surface layer, but in that case advantageously without the copolymer additive. They may also have a different composition, depending on the function that they carry out (supporting, reinforcing, adhesive, etc.).

In the process according to the invention, it is particularly advantageous to produce a polymer film by calendering. In fact, this processing technique makes it possible to obtain very wide films in a highly economical manner.

Consequently, the invention also relates to a calendered polymer film obtained by the process according to the invention.

The invention also relates to an inkjet-printed polymer film comprising a base polymer and a copolymer additive comprising a polymer group A and a polymer group B, group A having a lower surface tension than that of the base polymer and group B being compatible with the base polymer.

The film printed according to the invention preferably conforms to the films which may be obtained by the preferred embodiments of the process according to the invention.

Moreover, it has been observed that a composition comprising polyvinyl chloride and a copolymer additive comprising a polymer group A and a polymer group B, group A having a lower surface tension than that of the polyvinyl chloride and group B being compatible with the polyvinyl chloride gives rise, regardless of the processing technique used, to products having a particularly improved inkjet printability relative to that of products that are identical but without the additive.

The invention therefore also relates to a composition comprising polyvinyl chloride and a copolymer additive comprising a polymer group A and a polymer group B, group A having a lower surface tension than that of the polyvinyl chloride and group B being compatible with the polyvinyl chloride.

In the composition according to the invention, it is preferable that groups A and B of the additive conform to the preferred variants of the process according to the invention that relate to them.

The films obtained by the process according to the invention make it possible to obtain excellent resolution when inkjet printing.

The invention therefore also relates to a polymer-film printing method according to which an ink is projected by inkjet onto a polymer film comprising a base polymer and a copolymer additive comprising a polymer group A and a polymer group B, group A having a lower surface tension than that of the base polymer and group B being compatible with the base polymer.

In the printing method according to the invention, the ink is advantageously organic and preferentially free from aggressive solvents such as methyl hexyl ketone or cyclohexanone.

In the printing method according to the invention, the polymer film also preferentially conforms to the films which may be obtained by the preferred embodiments of the process according to the invention.

The invention finally relates to a system for inkjet printing comprising an ink and a polymer film comprising a base polymer and a copolymer additive comprising a polymer group A and a polymer group B, group A having a lower surface tension than that of the base polymer and group B being compatible with the base polymer.

In the system according to the invention, it is preferable that the ratio of the surface tension of the group A polymer to that of the ink be between 0.3 and 1.3, preferably between 0.5 and 1.

In the system according to the invention, the polymer film also preferentially conforms to the films which may be obtained by the preferred embodiments of the process according to the invention.

The following examples serve to illustrate the invention.

EXAMPLE 1

Not Conforming to the Invention

The following were mixed with 100 parts by weight of polyvinyl chloride: 21 parts of diethyl phthalate, 3 parts of epoxidized soybean oil, 15 parts of titanium dioxide and 2 parts of acrylic lubricant. The resulting mixture was processed into a film of 100 µm thickness, then subjected to inkjet dot printing, with a droplet diameter set at 35 µm, which corresponded to a projected surface area of about 1000 µm². After drying, the printed dots had a diameter of about 150 µm, being a dot gain of 4.2.

EXAMPLE 2

Conforming to the Invention

The method of Example 1 was followed, except that 0.25 parts of a polycaprolactone/polydimethylsiloxane/polycaprolactone copolymer were added to the composition.

After printing under the same conditions, the diameters of the printed dots were measured as 100 µm, being a dot gain of 3.

The invention claimed is:

1. A method for improving the resolution of inkjet printing of polymer films comprising blending a copolymer additive which comprises a polymer group A and a polymer group B with a base polymer comprising polyvinylchloride, wherein polymer group A has a lower surface tension than that of the base polymer and polymer group B is compatible with the base polymer and obtained from the same monomer as that of the base polymer.

2. The method of claim 1, wherein the step of blending comprises blending 0.1 to 1 parts by weight of additive per 100 parts of base polymer.

3. The method of claim 1, wherein the overall average molecular weight of the A group(s) of the additive is between 40 and 90% of the overall molecular weight of the additive.

4. The method of claim 1, wherein the polymer comprising group A is chosen from polyalkylsiloxanes and their grafted polymers or copolymers.

5. The method of claim 3, wherein the overall average molecular weight of the A group(s) of the additive is between 50 and 80% of the overall molecular weight of the additive.

6. The method of claim 1, wherein the polymer film is calendared.

7. An inkjet printing method comprising projecting an ink onto a polymer film, produced according to the method of improving inkjet printing according to claim 1.

8. The inkjet printing method of claim 7, in which the ink is organic.

9. A system for inkjet printing comprising an ink and a polymer film, which comprises a base polymer being polyvinylchloride and, blended with the base polymer, a copolymer additive comprising a polymer group A and a polymer group B, group A having a lower surface tension than that of the base polymer and group B being compatible with the base polymer and polymer group B is compatible with the base polymer and obtained from the same monomer as that of the base polymer.

10. The inkjet printing system according to claim 9, wherein the ratio of the surface tension of the group A polymer to that of the ink is between 0.5 and 1.

11. A polymer film obtained by a method for improving the resolution of inkjet printing of polymer films comprising polyvinylchloride and a copolymer additive which comprises a polymer group A and a polymer group B, wherein polymer group A has a lower surface tension than that of the polyvinylchloride and polymer group B is compatible with the polyvinylchloride and obtained from the same monomer as that of the polyvinylchloride.

12. The polymer film according to claim 11, wherein the film is a calendared film.

13. The polymer film according to claim 11, wherein the film is an inkjet-printed film.

14. The polymer film according to claim 11, wherein the polymer film comprises a blend of 0.1 to 1 parts by weight of additive per 100 parts of polyvinylchloride.

15. The polymer film according to claim 11, wherein the overall average molecular weight of the A group(s) of the additive is between 40 and 90% of the overall molecular weight of the additive.

16. The polymer film according to claim 15, wherein the overall average molecular weight of the A group(s) of the additive is between 50 and 80% of the overall molecular weight of the additive.

17. The polymer film according to claim 11, wherein the polymer group A is (i) a polyalkylsiloxane or (ii) a copolymer or grafted polymer of polyalkylsiloxane.

* * * * *